Aug. 3, 1965     A. L. WITT     3,198,561

HIGH PRESSURE DUCT CONNECTION

Filed May 13, 1963

INVENTOR.
ALBERT L. WITT

BY

ATTORNEY

United States Patent Office 3,198,561
Patented Aug. 3, 1965

3,198,561
HIGH PRESSURE DUCT CONNECTION
Albert L. Witt, Glenside, Pa., assignor to W. M. Anderson Company, Philadelphia, Pa., a corporation of Pennsylvania
Filed May 13, 1963, Ser. No. 279,708
2 Claims. (Cl. 285—364)

This invention relates to high pressure duct connections and more particularly to such connections for air ducts made of sheet metal.

Various types of sealed joints for flanged pipe and ducts have heretofore been proposed. These have been difficult to assemble, unnecessarily complex, excessively costly, required separate or extra parts which could easily be lost, or had other objectionable characteristics.

It is the principal object of the present invention to provide a high pressure connection, particularly for sheet metal ducts, which is simple in construction, easy to assemble for use, and with which an effective seal is obtained.

It is a further object of the present invention to provide a high pressure duct connection, particularly for air ducts of sheet metal, in which the duct has an integral flange applied thereto in the shop and which is quickly and easily assembled at the place of use.

It is a further object of the present invention to provide a high pressure duct connection having as components a specially shaped integral duct flange, a self forming gasket and a locking device which is externally applied without the necessity for making any holes in the duct or in the flange.

It is a further object of the present invention to provide a high pressure duct connection having a simple but effective seal between integral flanges on the duct sections.

Other objects and advantageous features will be apparent from the description and claims.

The nature and characteristic features of the invention will be more readily understood from the following description taken in connection with the accompanying drawings forming part thereof, in which.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, aligned and meeting duct sections 10 are shown. The shape of duct is not critical since, as will hereinafter be apparent, the duct connection is equally suitable for various shapes of duct sections. Rectangular sections 10, such as those specifically illustrated, are useful for purposes of explanation since they involve additional problems at the corners which do not occur with circular ducts and are extensively used to save space.

Figure 1:
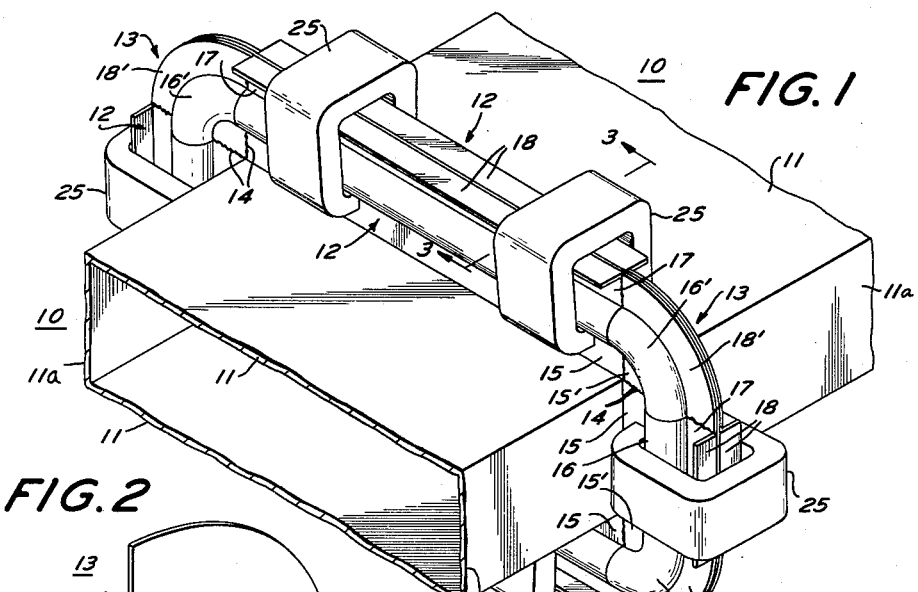
FIGURE 1 is a view in perspective of duct sections with the connection in accordance with the invention therebetween.
Figure 2:
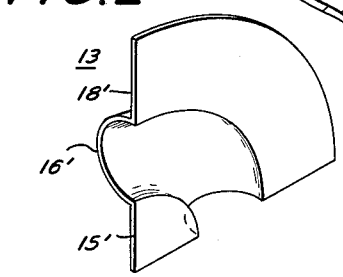
FIG. 2 is a view in perspective and enlarged, of one of the corner inserts employed as part of the integral duct flange.
Figure 3:
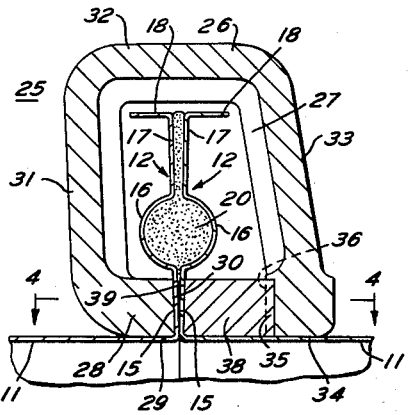
FIG. 3 is a sectional view, enlarged, longitudinally of the duct sections and approximately on the line 3—3 of FIG. 1 showing the details of the flange, seal and clamp.
Figure 4:
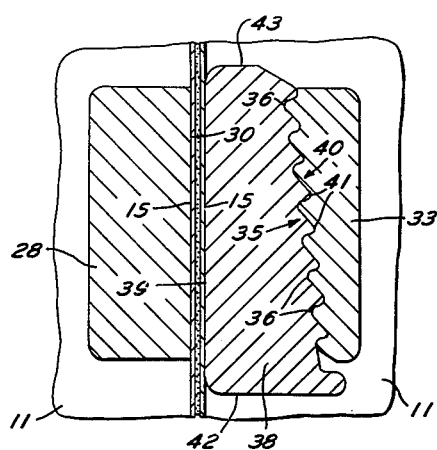
FIG. 4 is a longitudinal sectional view, still further enlarged, taken approximately on the line 4—4 of FIG. 3.

The duct sections 10 have opposite pairs of enclosing walls 11 and 11a of sheet metal. The walls 11 and 11a have extending perpendicularly outwardly therefrom flanges 12 shaped as hereinafter explained. In order to complete the corners and insure a seal at these locations corner flange inserts 13 (shown in FIG. 2) are provided. The flange inserts 13 are secured at their end margins, preferably by welding as at 14, to the end margins of the flanges 12, and to the duct section 10.

Each of the flanges 12 has a flat flange portion 15 extending perpendicularly with respect to and along the wall 11 or 11a and accordingly to the longitudinal axis of the duct 10. Integrally connected to the flat flange portion 15 and extending therealong for the length of the portion 15 an outwardly convexed curved, and preferably substantially semi-cylindrical, flange portion 16 is provided serving as a groove to receive sealing material. Integrally connected to and extending along the length of the curved portion 16 a flat flange portion 17 is provided, disposed in the same plane is the flat flange portion 15. From the flat flange portion 17 perpendicular with respect thereto and extending backwardly along the wall 11 in spaced parallel relation thereto, flat stiffening flange portions 18 are provided.

The corner flange inserts have flat flange portions 15' connecting the flange portions 15 at the duct corners, curved flange portions 16' extending around the duct corners and connecting the curved portions 16, and flange portions 17' extending around the duct corners and connecting the flat flange portions 17.

Merely by way of specific illustration for one embodiment, the curved section of the flange portions 15 is at a width of ⅜ inch from the outside of the duct. The curved flange portion 16 has an inside diameter of ⅜ inch and the total width of the flange 12 is 1¼ inches.

It will be seen that this construction provides a continuous integral flange traversing the entire perimeter at each end of each duct 10 with a continuous groove 16, 16' intermediate the duct walls 11 and 11a and the outer margins of the flange 12 and flange inserts 13.

When the duct sections 10 are to be assembled, a self-forming gasket 20 is inserted entirely around the flange 12 in one of the curved flange portions 16, 16' and the flange 12 of the next duct section 10 brought into register therewith.

The gasket 20 can be of any desired material which is deformable, permanently plastic, adherent, free from odor, and not corrosive to the duct sections 10. It is preferred that it be round in cross section with a diameter greater than that of the curved flange portions 16, 16' and for the specific dimensions stated above has a diameter of 7/16 inch.

Any composition having the desired characteristics can be employed for the gasket 20 but it preferably includes a synthetic resin vehicle with an asbestos fiber filler, with a penetration of 100 grams at 65 to 100, an ASTM Designation D552, remaining completely pliable to −35° F. and to 180° F. or at 250° F. under intermittent heat conditions.

In order to retain the flange 12 in assembled position, and to compress the gasket 20 so as to extrude and spread a film thereof inwardly between the flange portions 15 and 15' and outwardly between the flange portions 17 and 17' a plurality of clamps 25 are applied in engagement with the flanges 12.

A particularly suitable clamp 25 is shown which includes a generally C-shaped body 26 of substantially flat channel section between its ends with the interior partially relieved as at 27 and retained in part from displacement by the curved flange section 16.

The body 26 has an end 28 with a face 29 for disposition along the duct wall 11 or 11a, and a flat inner end face 30 to engage one of the flange portions 15. The body 26 has integral and extending from the end 28, a side section 31 preferably disposed at a slight obtuse angle to the plane of the wall 11 or 11a. The body 26 also has integral with and extending from the side section 21 a bridging section 32, and integral with and extending from the bridging section 32 another side section 33. The side section 33 is disposed at a slight acute angle to the wall 11 or 11a, has a face 34 for disposition along the duct wall 11 or 11a and an inner end face 35. The inner end face 35 is at an inclination to the flanges 12 to provide a wedging action and has a plurality of gripping serrations 36 extending from top to bottom along the face 35 and of a depth of the order of $\frac{1}{16}$ inch.

A wedge 38 is provided having a face 39 for engagement with a flange section 15 and an opposite angularly disposed face 40 with serrations 41 complemental to the serrations 36 and for engagement therewith. The wedge 38 has a large striking end 42 for insertion and a small striking end 43 for removal.

In the specific embodiment referred to above the clamps 25 are preferably not more than about eight inches from a corner nor than about sixteen inches apart.

The wedge 38 is initially inserted between the flange portion 15 and the serrated face 35 and the end 42 struck with a hammer or similar tool to drive it to a tight gripping condition.

When the clamps 25 are in gripping position the flange portions 15, and 15' and 17 and 17' are separated only by thin films 44 of the self-forming gasket 20. If desired the connection can be separated by removing the wedges 38.

The connection provides an efficient sealed high pressure joint between duct sections 10 and effectively accomplishes the objects of the invention.

I claim:

1. A duct joint for the connection of adjacent ends of duct sections comprising on each end of said duct sections, and as an extension of the walls of each duct section, an integral imperforate stiffening flange extending perpendicularly outwardly from the walls of the duct sections and having a stiffening groove thereon and on both faces of each of said flanges spaced outwardly from the duct section walls and inwardly of the outer margins of the flange, said flanges being disposed in meeting relation at the innermost portions thereof with the interiors of said grooves in facing relation, plastic packing material between said flanges and in the spaces in said grooves, spaced clamping members having elongated portions engaging said duct walls and opposite exterior portions of said flanges at locations contiguous to the meeting portions thereof and between said grooves and said duct walls retaining the duct sections in alignment and in sealed condition at said flanges, said duct sections having flat sides and corners at meeting locations of said sides and said flanges at the corners having inserts extending around the corners, means retaining said inserts against said flanges, said corner inserts having grooves connecting the grooves of said flanges, said plastic packing material substantially filling said grooves in said inserts, and said plastic packing material in all of said grooves cooperating to form a fluid tight seal completely around said joint.

2. A duct joint as defined in claim 1 in which said clamping members have adjustable wedges therein for tightening the clamping members.

References Cited by the Examiner

UNITED STATES PATENTS

| 1,185,049 | 5/16 | Best | 285—364 |
| 1,416,334 | 5/22 | Connery | 285—424 |
| 1,450,826 | 4/23 | Walten | 285—424 |
| 1,740,237 | 12/29 | Greenwood et al. | 220—9 |
| 1,791,810 | 2/31 | Furman | 285—328 |
| 2,540,781 | 2/51 | Glitsch | 24—126.1 |
| 2,829,793 | 4/58 | Baumann | 285—336 |
| 3,079,651 | 3/63 | Hagmann et al. | 285—336 |

FOREIGN PATENTS

| 1,094,515 | 12/54 | France. |
| 647,059 | 6/37 | Germany. |

CARL W. TOMLIN, *Primary Examiner.*